B. KAUFHOLD & J. A. ESS.
BEET HARVESTER AND TOPPING MACHINE.
APPLICATION FILED JUNE 1, 1916.

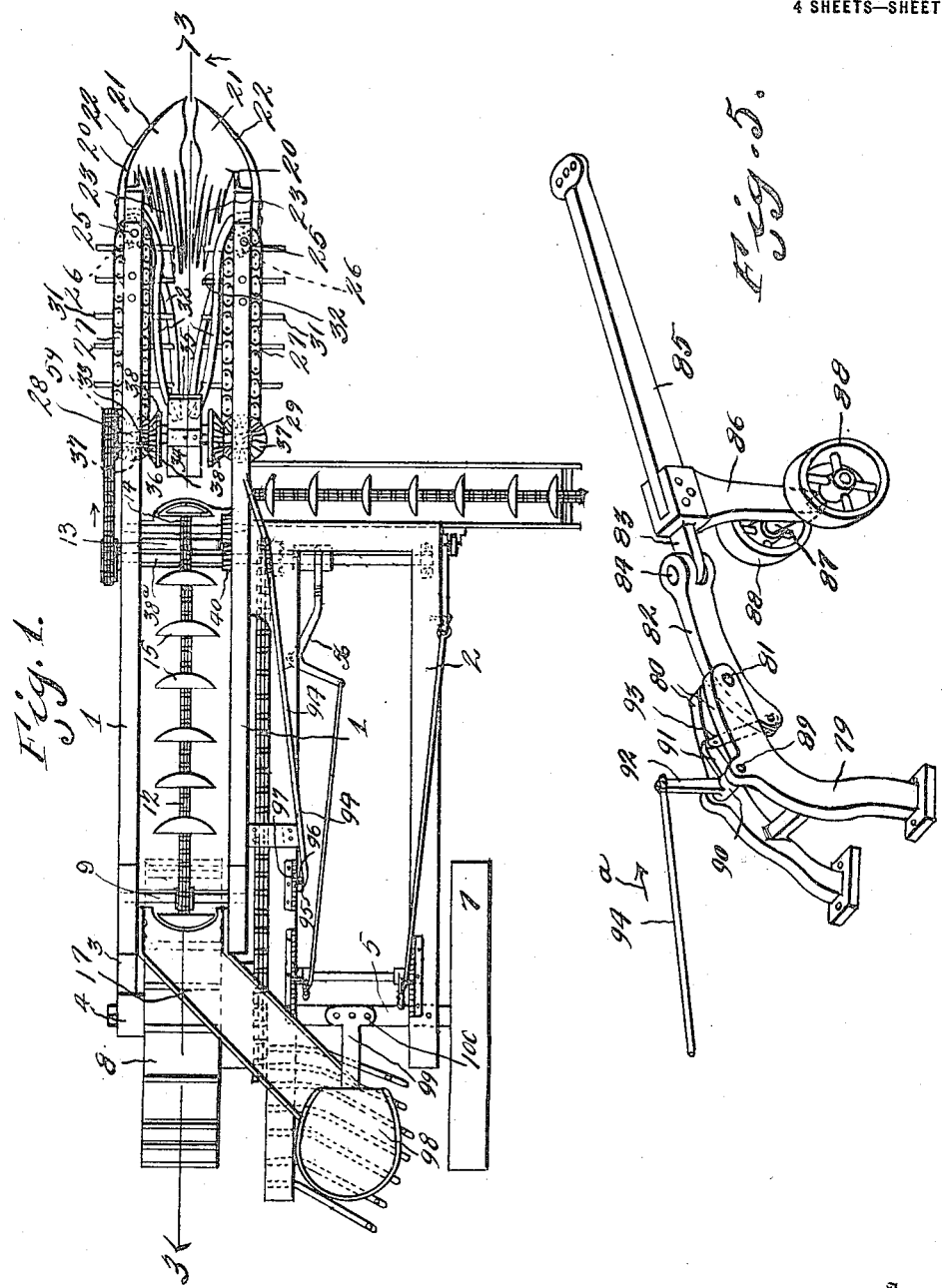

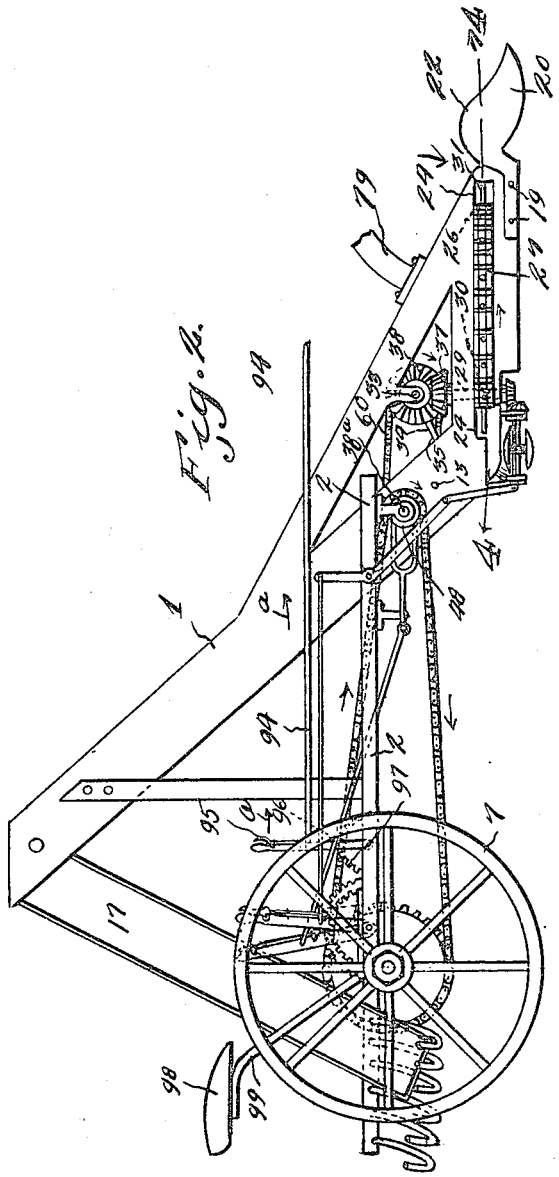

1,257,081.

Patented Feb. 19, 1918.
4 SHEETS—SHEET 3.

Witnesses

Inventors
B. Kaufhold
John A. Ess
By
Attorneys

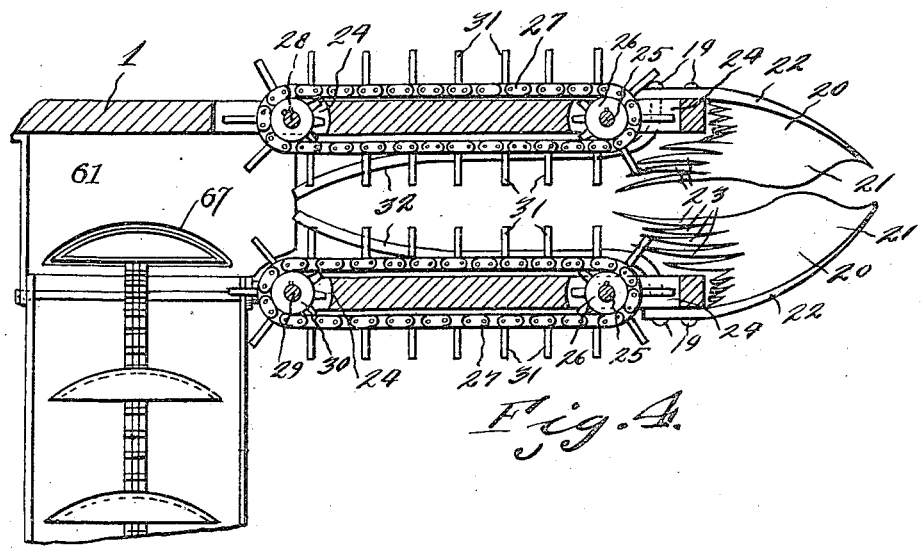

UNITED STATES PATENT OFFICE.

BERNARD KAUFHOLD AND JOHN A. ESS, OF KIMBALL, MINNESOTA.

BEET HARVESTER AND TOPPING MACHINE.

1,257,081. Specification of Letters Patent. Patented Feb. 19, 1918.

Application filed June 1, 1916. Serial No. 101,154.

*To all whom it may concern:*

Be it known that we, BERNARD KAUFHOLD and JOHN A. ESS, citizens of the United States, residing at Kimball, in the county of Stearns, State of Minnesota, have invented a new and useful Beet Harvester and Topping Machine; and we do hereby declare the following to be a full, clear, and exact description of the invention, such as will enable others skilled in the art to which it appertains to make and use the same.

This invention relates to an improved beet harvester and topping machine, and an object of the invention is to provide a machine of this kind which comprises simple, efficient and practical features of construction.

Another object of the invention is to provide a machine of this kind having an improved digger for digging or gouging the beets from the ground.

In practical fields the details of construction may necessitate alterations, falling within the scope of what is claimed.

The invention comprises further features and combination of parts as hereinafter set forth, shown in the drawings and claimed.

In the drawings:—

Figure 1 is a plan view of the improved harvester and beet topping machine constructed in accordance with the invention.

Fig. 2 is a view in side elevation of the same.

Fig. 3 is a longitudinal sectional view on line 3—3 of Fig. 1.

Fig. 4 is a sectional view on line 4—4 of Fig. 2.

Figure 5:
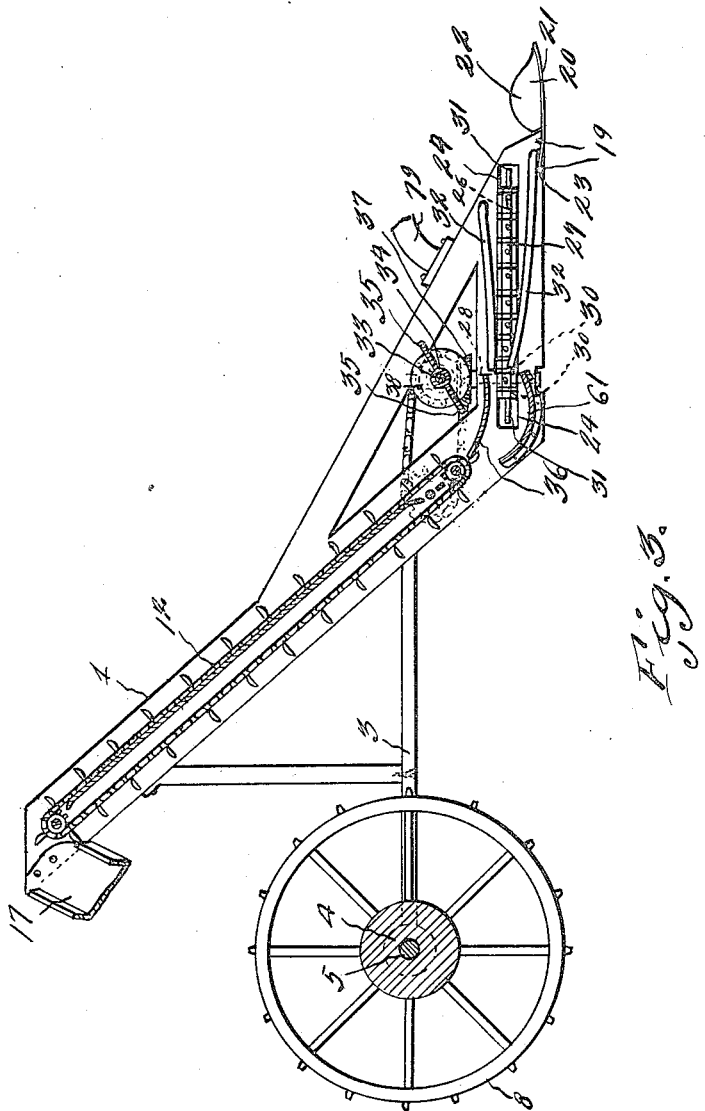
Fig. 5 is a view in perspective of the forward frame of the machine.

Referring more especially to the drawings 1 designates the main frame of the machine, which is provided with a lateral portion 2 and a rearwardly extending part 3, the side bars of which part 3 at their extremities are connected to the shaft 5 as at 4. The lateral part 2 of the frame is connected to one end of the shaft 5 as at 6. A supporting wheel 7 is carried by one end of the shaft 5 and the traction wheel 8 by the other end. The forward ends of the side bars of the frame 1 have secured thereto by the bolts or the like 19 digger members 20, which curve forwardly and toward each other. The bottoms 21 of the digger members have their adjacent edge portions so shaped and separated as to permit the dirt to sift therethrough, as the beets are dug from the soil. The outer curved edges of the digger members have flanges 22 rising upwardly, to prevent the beets from falling to one side or the other. The rear portions of the bottoms of the digger members have elongated rearwardly extending flexible fingers 23, upon which the beets travel or move as they are conveyed rearwardly. To the rear of the digger members, the forward parts of the sides of the frame 1 have elongated openings 24, and mounted in bearings adjacent the forward extremities of the side of the frame 1 are the vertical shafts 25, which are provided with sprockets 26, about which sprocket chains 27 travel. Also mounted in bearings of the sides of the frame 1 are the vertical shafts 28 and 29 having sprockets 30, about which the chains 27 pass, and which chains operate in the elongated openings 24 and are provided with laterally extending projections 31, which move rearwardly and are directly opposite each other and act to grapple the beets and convey them rearwardly from the fingers 23, between which the dirt and the like sifts. The rearwardly extending flexible fingers 23 are of different lengths, in order to conform to the adjacent parts of the conveyer chains 27, as shown clearly in Fig. 1. In further words, these fingers are of such different lengths, as to extend into the throat between the two conveyer chains 27, whereby the beets or the like on said fingers may be easily grappled and removed by the fingers 31 of the chains. Projecting rearwardly and secured to the inner adjacent faces of the sides of the frame 1 are arms 32, which assist in guiding the beets toward the beet topper. Mounted in bearings of the forward parts of the sides of the frame is a horizontal transversely disposed shaft 33, on which the beet topper or cutter 34 is journaled. This topping or cutting device is provided with two blades 35, which so travel or move, as to sever the tops from the beets, and toss them in the apron 36, which extends from under the revoluble topper to and toward the lower part of the conveyer chain 12, so that as the tops of the beets pile up on the apron 36, the cups 15 of the conveyer chain 12 pick them up and carry them upwardly and rearwardly to the chute 17 or trough. Upon the upper ends of the shafts 28 and 29 are beveled gears 37, which mesh with the beveled gears 38 on the shaft 33 of the topping device. Secured to one side of the frame 1 is a semi-circular curved apron 61, into which the projections or fingers on the chains 27 convey the beets as they are topped. Secured to the upper forward edges of the sides of the frame 1 is a casting 79, the arms 80 of which extend forward, and pivoted between their extremities upon the pin 81 is a link 82, the rear arm of which extends rearwardly and downwardly. The forward arm of the link 82 is connected to the rearwardly extending lug 83 of the draft pole or tongue 85 by means of the pin 84. The draft pole or tongue is carried by the supporting leg 86, in the lower end of which an axle 87 is journaled, the axle being provided with the supporting wheels 88. By means of the pivot 84 the draft pole or tongue with the supporting wheels 88 may be turned to the right or the left. Journaled in bearings of the arms 80 of the casting 79 is a pin 89, on which the sleeve 90 is mounted. The sleeve 90 has two arms 91 and 92, the arm 91 being connected to the rearwardly and downwardly extending arm of the link 82 by means of the link 93, and connected to the arm 92 is a rod 94, which in turn is connected to the lever 95, which is held in adjusted positions by the dog 96 and rack 97. It is to be observed that by moving the lever 95 forwardly in the direction of the arrow a, the digger members and the forward extremity of the frame 1 will be lowered. A reverse movement of the lever 95 will elevate the diggers. On an examination of Fig. 1 it will be seen that the lowermost arms 32 are curved or extended farther inwardly and toward each other than the upper arms 32, to insure supporting means for the beets until they reach the apron 61. All the levers are located in close position to the operator's seat 98 which is carried by the supporting arm 99, which is secured at 100 to the lateral portion 2 of the frame. In this way the operator may manipulate said levers to operate various parts of the machine.

The invention having been set forth what is claimed as new and useful is:—

1. In a harvester and beet topping machine, a frame having a digger end, the sides of the digger end having opposed conveying members, digger members secured to the forward ends of the sides of the digger end, said digger members having rearwardly extending fingers arranged in series and being of different lengths, to conform to the conveying members.

2. A structure as specified in claim 1, said fingers being yieldable, and the fingers of each series being spaced from each other.

3. A structure as specified in claim 2, the adjacent faces of the sides of the digger end having rearwardly extending yieldable arms opposing each other, the lowermost of said arms being curved farther toward each other than the uppermost arms, to insure supporting of the beets.

4. In a harvester and beet topping machine, a frame having a digger end, a pair of digger members secured to the opposite sides of the digger end and having rearwardly extending yieldable fingers of different lengths.

5. A structure as specified in claim 3, and a topping device at the rear extremity of said arms.

In testimony whereof we have signed our names to this specification in the presence of two subscribing witnesses.

BERNARD KAUFHOLD.
JOHN A. ESS.

Witnesses:
E. ENDERLE,
GEORGE ESS.